United States Patent [19]

Jochemczyk et al.

[11] Patent Number: 4,538,927
[45] Date of Patent: Sep. 3, 1985

[54] ELECTRICAL TEMPERATURE SENSOR, PARTICULARLY FOR FEVER THERMOMETER USE

[75] Inventors: Claus Jochemczyk; Joachim Kwiatkowski; Klaus Herrmann, all of Berlin, Fed. Rep. of Germany

[73] Assignee: Robert Bosch GmbH, Stuttgart, Fed. Rep. of Germany

[21] Appl. No.: 570,207

[22] Filed: Jan. 12, 1984

[30] Foreign Application Priority Data

Jan. 12, 1983 [DE] Fed. Rep. of Germany ....... 3300733

[51] Int. Cl.³ .............................................. G01K 7/00
[52] U.S. Cl. .................................... 374/163; 374/208; 374/179
[58] Field of Search ............... 374/208, 209, 210, 158, 374/163, 183, 185, 179; 338/28, 29, 30; 206/306; 138/33, 157, 162

[56] References Cited

U.S. PATENT DOCUMENTS

| 1,823,819 | 9/1931 | Crampton | 374/208 |
| 3,147,457 | 9/1964 | Gill et al. | 374/208 |
| 3,257,863 | 6/1966 | Hanson | 374/208 |
| 4,018,624 | 4/1977 | Rizzolo | 374/208 |
| 4,174,631 | 11/1979 | Hammerslag . | |
| 4,183,248 | 1/1980 | West | 374/208 |
| 4,411,535 | 10/1983 | Schwarzschild | 374/208 |
| 4,429,213 | 1/1984 | Mathiew | 138/33 |
| 4,450,315 | 5/1984 | Waterman | 374/208 |
| 4,453,835 | 6/1984 | Clawson et al. | 374/185 |

FOREIGN PATENT DOCUMENTS 2938031 4/1981 Fed. Rep. of Germany .

Primary Examiner—Charles Frankfort
Assistant Examiner—David R. Schuster
Attorney, Agent, or Firm—Frishauf, Holtz, Goodman & Woodward

[57] ABSTRACT

The temperature sensor is particularly suitable for a fever thermometer which has outer dimensions of, for example, 4 mm diameter and 40 mm length. To provide the requisite stiffness, the outer sleeve is made of stainless steel or specialty steel of thin walls, for example less than 0.1 mm wall thickness, closed at one end, and the temperature sensor is positioned essentially exposed, and naked at the end of a positioning body formed of two half-sections of low-density foam material, in which a longitudinal groove is formed, through which the connecting wires of the temperature sensor extend. The longitudinal groove can be filled by a springy element, for example unitary with one of the half-sleeves, or a separate positioning rod. The connecting ends of the sensor conductors can be connected to a coaxial cable, and the end portion can have a handle plastic-molded thereabout. The exposed positioning of the sensor, adhesively connected to the inner end of the sensor tube, provides for low heat capacity, high heat transfer, and the foam filling additionally contributes to heat sensitivity.

7 Claims, 5 Drawing Figures

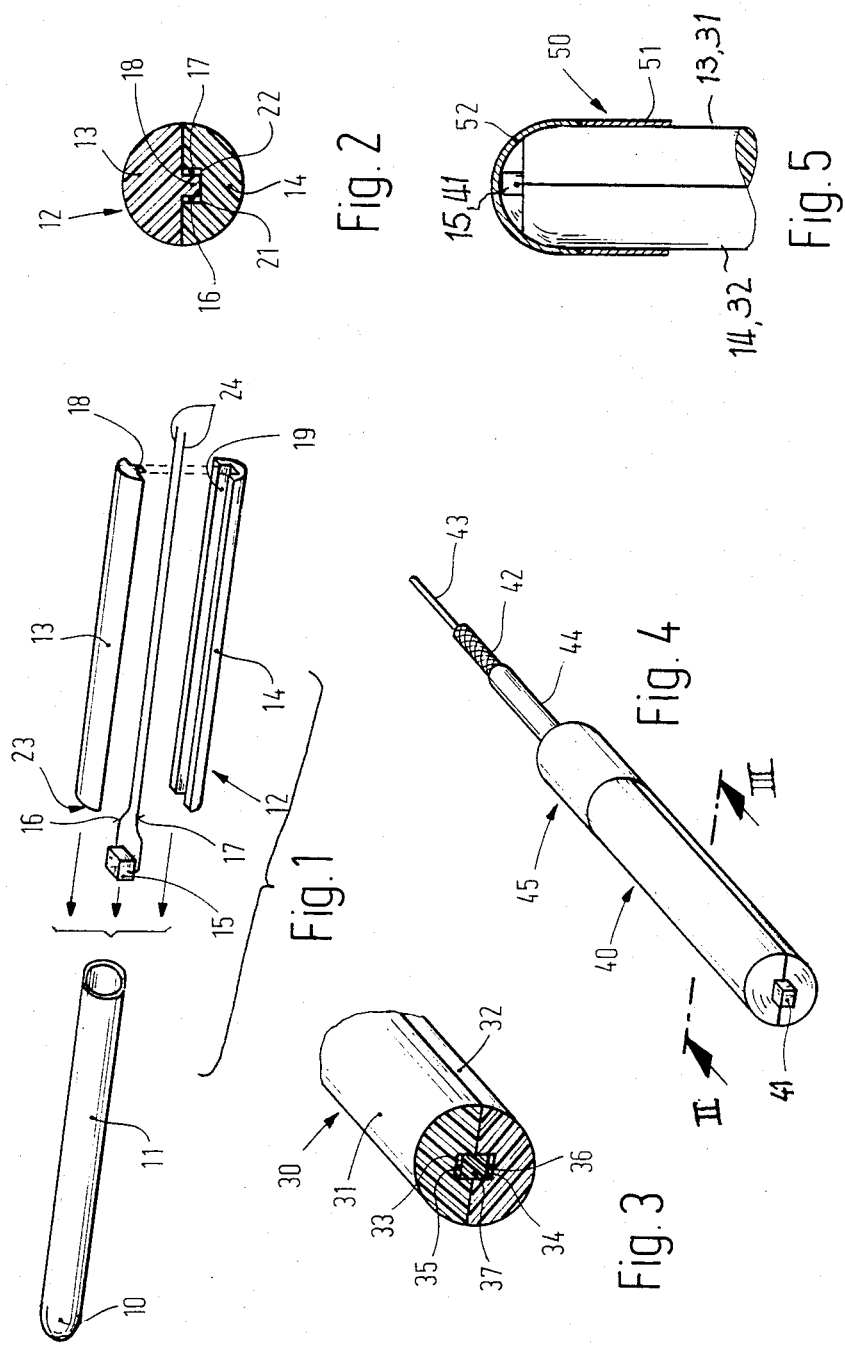

ELECTRICAL TEMPERATURE SENSOR, PARTICULARLY FOR FEVER THERMOMETER USE

The present invention relates to a temperature sensor, and more particularly to a temperature sensor suitable for use as a fever thermometer, that is, for various types of clinical or veterinary applications, although the structure can be used as a temperature sensor in general.

BACKGROUND

It has previously been proposed—see U.S. Pat. No. 4,174,631 (to which German Patent Disclosure Document DE-OS No. 29 38 031 corresponds) to provide temperature sensors which are essentially tubular and can be used as fever thermometers. It has been found that it is desirable that temperature sensors suitable for clinical use have a certain degree of stiffness. It has been proposed—see German Patent Disclosure Document DE-OS No. 30 49 056—to provide a ceramic cylinder, surrounded by a metal tube. Temperature sensors of this type are primarily suitable for high-temperature use, far in excess of the temperature range of a fever thermometer. The referenced German Disclosure Document, for example, discloses that the sensor has excellent mechanical stability, which can be tested, for example, by letting the sensor drop, and is suitable for temperature changes between 300° C. and 600° C., and has low thermal inertia and thus short response time.

For clinical use, the response time should be even shorter than that of previous temperature sensors, and should have excellent heat transfer characteristics, with low heat transfer resistance.

Low heat transfer resistance can be obtained by using a heat-conductive bridge formed of highly heat-conductive material, such as copper or silver. Use of such heat conductors has the disadvantage, however, that the heat capacity of the temperature sensor is increased. Consequently, when the temperature is used in media of low viscosity, for example when being immersed in pastes, gels, or contacted by biological tissues, in which the temperature for temperature balance is not obtained by convection—as in water—but rather by conduction to the temperature sensor, the higher heat capacity which is inherent in heat conductors to the temperature sensor necessarily increases the measuring time. The heat transfer resistance of the sensor hardly is important when contacted by the media mentioned above with respect to the heat transfer resistance in the medium itself. The measuring time, hence, is determined practically exclusively by the heat capacity of the temperature sensor itself.

THE INVENTION

It is an object to improve temperature sensors, and particularly the heat characteristics thereof, while retaining the advantage of small size, and still permitting the sensor to have the required stiffness to enable its use in clinical, which includes veterinary, applications, and to so construct the sensor that the heat capacity within the region of the sensing element itself is small, while providing an overall structure which requires only little material and is inexpensive and readily assembled.

Briefly, the temperature sensor is surrounded by a metallic sleeve, made of cold-wrought, high-strength metal of very thin wall thickness, so that its heat capacity is at a minimum, consistent with the necessary or required stiffness of the sleeve; in other words, the metal is just thick enough to give the sensor the required stiffness without, however, increasing its heat capacity. Stainless steel or specialty steel is suitable. The sensor itself is located within the sleeve—which is closed off at one end—by a positioning element which is formed of low-mass, closed-pore plastic foam. The sensor element is an essentially exposed, naked thermal element, located within the closed end of the sleeve and adhesively retained in the sleeve.

The sensor element is not encapsulated or potted and, hence, is termed "essentially exposed, naked" although parts or zones thereof may have a thin coating of an adhesive applied thereto to adhere the sensor element to the interior of the sleeve, adjacent the closed end thereof.

The sensor has the advantage of low heat capacity, and required stiffness, while maintaining required dimensions for, for example, clinical use.

In accordance with a preferred feature of the invention, the low-mass, closed-pore plastic foam is formed as two elongated half-cylinders forming an assembly structure. The half-cylinders, or one of them, may be formed with a longitudinal groove at the flat surface thereof to receive connecting conductors to the sensor element itself and a holding element to connect the two half-sleeve portions together, for example in form of a spring element, a projection from the other half-sleeve, a longitudinal strip, or the like.

DRAWINGS

FIG. 1 is an exploded, pictorial representation of the temperature sensor;

FIG. 2 is a cross section through the plastic assembly element of FIG. 1, taken along line II-III of FIG. 4;

FIG. 3 is a fragmentary cross-sectional view of another embodiment of a plastic assembly element, taken along line II-III of FIG. 4;

FIG. 4 is a pictorial view of an assembled insert for the metal sleeve, connected to a coaxial cable; and FIG. 5 is an axial section through the sleeve of the sensor, and illustrating the interior positioning of the assembly elements.

DETAILED DESCRIPTION

The temperature sensor illustrated in the drawings is designed for use as an electronic fever thermometer. A closed sleeve 11, closed off by an end cap 10, has an assembly or positioning element 12 located therein. The positioning element 12 is formed of two half-cylinders 13, 14 which, when placed with flat surfaces against each other, fit snugly within the sleeve 11. The positioning elements 13, 14 hold a thermal electric sensor element 15 in position, and further retain and guide two terminal or connecting lines 16, 17. The upper half-cylinder 13 has a longitudinal spring element 18 extending over the entire length of the half-cylinder and projecting from the flat surface thereof. The lower half-cylinder 14 is formed with a longitudinal groove 19, dimensioned and shaped to receive the spring element 18. As best seen in FIG. 2, the connecting lines 16, 17 are located at both sides of the spring element 18, and are guided in notches or grooves 21, 22 located adjacent the longitudinal spring element. When assembled, the sensor 15 is located at the leading facing end 23 of the positioning element 12, abutting thereagainst, and the ends 24 of the connecting lines 16, 17 extend freely from the positioning element 12. Spring element 18 can be a unitary projection from half-cylinder 13.

A typical fever thermometer temperature sensor has these dimensions:

outer diameter (OD): about 4 mm
length: about 40 mm.

The stiffness of the sleeve 11 will depend on the desired use of the sensor. A low heat capacity is desired, which can be obtained by utilizing only little material which is heat-conductive. The sleeve 11, thus, is formed with a wall thickness of, preferably, not more than about 0.1 mm, and uses a material which is a high-strength, cold-wrought metal, preferably a specialty steel, stainless steel or the like. The plastic foam should be temperature-resistant to a temperature of at least 140° C. to permit autoclaving, or otherwise steam-sterilizing the thermometer. Particularly suitable foams are hard-foamed polymethacrylimide. The assembly body is used not only to hold in position the wires 16, 17, but also the sensor element 15 itself; it is used to guide the connecting lines 16, 17, insulated from each other and from the metal sleeve, and, further, forms a convection interruption between the sensing element 15 and the portion of the temperature sensor 11 which is remote from the sensing end and from the cap 10.

The sensing element 15, preferably, is a thermal electric structure which is positioned at the end of the positioning element 12 in exposed form. The usual potting or encapsulating compound, or other plastic or similar material is not used, deliberately, in order to decrease the temperature response time. The element, thus, can be described as located within the tube 11 and as a naked, or essentially exposed element.

Embodiment of FIG. 3: The positioning element 30 is formed of two half-cylinders (31, 32) which have identical cross sections. Both half-cylinders have, each, a longitudinal groove 33, 34. Assembly is carried out by first positioning one of the connecting lines, e.g. line 36, in the groove 34; then positioning a rod 37 of essentially rectangular cross section in the groove, and then placing the second connecting line 35 in the respective groove 33 of the upper half-cylinder element 31.

The complete positioning element 40—see FIG. 4—which may be constructed in accordance with FIG. 2 or FIG. 3—has the respective connecting lines 16, 17 or 35, 36 connected to an external coaxial cable, formed by an external conductor 42, an internal conductor 43 insulated therefrom, and a jacket 44. The transition region between the positioning element 40 and the coaxial cable is injection-molded with plastic, so that a stable cylindrical unitary structure will result, formed by the positioning element 40 and the coaxial cable with a plastic coated transition zone, within which the electrical connections between the respective connecting wires 16, 17; 35, 36 and the wires of the coaxial cable are made. The assembly, to which the sensing element 41 is connected by an adhesive, is then introduced as a unit into the closed sleeve 11, 10 as shown in FIG. 1. The open end of the sleeve 11 is then sealed with respect to the assembly element 40, or the coaxial cable, respectively, or the transition zone, in any suitable and well-known and desired manner, for example by injection-molding a handle element or the like thereover.

FIG. 5 illustrates another embodiment in which a sleeve 50 is not a deep-drawn single structure but, rather, a sleeve 51 similar to the sleeve 11 formed as a cylindrical tube to which a cap 52 is secured by welding.

Assembly of positioning structure and sensor element: Preferably, the sensor 15, 41 at the inside of the cap 10 or 52 of the sleeve 11 or 51 is carried out in two steps. First, a thin insulating coating of adhesive is applied to the sensor element 15, 41, respectively, dry, and then a second adhesive coating is applied. The sensor is positioned, with the wires located in the respective longitudinal grooves, against an end face of the half-cylindrical positioning elements 13, 14 or 31, 32, respectively, and the thus formed subassembly is telescopically inserted into the sleeve 11, 51, with the sensor 15, 41 being positioned against the interior of the end cap as shown in FIG. 5. By telescoping the sleeve about the assembly or positioning element 12, 30, 40, respectively, in which the largest proportion of the positioning element is formed by closed-pore, low-density foam, a structure results which is of low mass, while insuring excellent heat-conductive connection between the cap end of the sleeve and the sensor element 15, 40, respectively. In a preferred form, the adhesive is of the characteristic that it is good heat-conductive, while having high insulating capacity.

Various changes and modifications may be made, and any features described may be used with any of the others, within the scope of the inventive concept.

A suitable adhesive for coating of the sensor element 15, 41 and adhering it in the inside of the end cap 10, 52 is: "Deltabond No. 152" (Wakefield Engineering, 60 Audobon Rd., Wakefield Ma./01880/USA).

We claim:

1. Electrical temperature sensor, particularly fever thermometer, having
    an electrical temperature sensor element (15, 41);
    two connecting wires (16, 17, 35, 36) extending from the sensor element;
    an elongated metallic holding sleeve (11, 51) closed at one end (10, 52) surrounding the sensor and retaining at least one of the connecting wires, in insulated relation, and guiding said at least one wire from the closed end to a second end; and
    a positioning element (12, 30, 40), comprising two half-cylindrical structures, located interiorly of the sleeve, for positioning the sensor element therein,
    wherein, in accordance with the invention, the sleeve (11, 51) comprises
    cold-wrought or cold-drawn high strength material of such minor thickness that its heat capacity is at a minimum, consistent with required stiffness of the sleeve;
    the positioning element (12, 30, 40) comprises a low-mass, closed-pore plastic foam; and
    the sensor element (15, 41) is an essentially exposed, naked electrical thermal element, positioned within the closed end (10, 52) of the sleeve (11, 51) and adhesively retained therein;
    one of the half-cylinder structures has a longitudinally positioned, springy structure (18) projecting from a flat surface thereof, and the other half-cylinder (14) is formed with a longitudinal groove (19) dimensioned and shaped to receive said springy structure (18); and
    the connecting lines (16, 17) of the sensor (15) are located between said springy structure (18) and the longitudinal groove.

2. Sensor according to claim 1, wherein said sensor element is retained within the closed end (10, 52) of the sleeve (11, 51) by a highly heat-conductive, highly insulating adhesive.

3. Sensor according to claim 1, wherein the low-mass, closed-pore plastic foam comprises low-density foam which is temperature-stable up to a temperature of about 140° C.

4. Electrical temperature sensor, particularly fever thermometer, having an electrical temperature sensor element (15, 41);

two connecting wires (16, 17, 35, 36) extending from the sensor element;

an elongated metallic holding sleeve (11, 51) closed at one end (10, 52) surrounding the sensor and retaining at least one of the connecting wires, in insulated relation, and guiding said at least one wire from the closed end to a second end; and a positioning element (12, 30, 40), comprising two half-cylindrical structures, located interiorly of the sleeve, for positioning the sensor element therein, wherein, in accordance with the invention, the sleeve (11, 51) comprises cold-wrought or cold-drawn high strength material of such minor thickness that its heat capacity is at a minimum, consistent with required stiffness of the sleeve;

the positioning element (12, 30, 40) comprises a low-mass, closed-pore plastic foam; and the sensor element (15, 41) is an essentially exposed, naked electrical thermal element, positioned within the closed end (10, 52) of the sleeve (11, 51) and adhesively retained therein;

the half-cylinders (31, 32) have the same cross-sectional shape;

each one of the half-cylinders is formed with a longitudinal groove (33, 34), and a longitudinal rod (37) is provided, located in said longitudinal grooves, and connecting said half-cylinders together;

and wherein the connecting wires (35, 36) from the temperature sensor element (41) are positioned, respectively, in the grooves of the half-cylinder elements.

5. Sensor according to claim 4, wherein the grooves have essentially rectangular cross section;

and the rod has essentially rectangular cross section filling, essentially, the entire space of the grooves when the half-cylinders are assembled together with their flat surfaces facing each other.

6. Sensor according to claim 4, wherein said sensor element is retained within the closed end (10, 52) of the sleeve (11, 51) by a highly heat-conductive, highly insulating adhesive.

7. Sensor according to claim 4, wherein the low-mass, closed-pore plastic foam comprises low-density foam which is temperature-stable up to a temperature of about 140° C.

* * * * *